Aug. 19, 1969 M. E. NELSON 3,461,563
ROTARY DENTAL TOOL
Filed Oct. 18, 1966 2 Sheets-Sheet 1

INVENTOR.
MILTON E. NELSON
BY
Warren, Brosler, Cypher & Anglin
ATTORNEYS

Aug. 19, 1969　　　M. E. NELSON　　　3,461,563
ROTARY DENTAL TOOL
Filed Oct. 18, 1966　　　　　　　　　　2 Sheets-Sheet 2
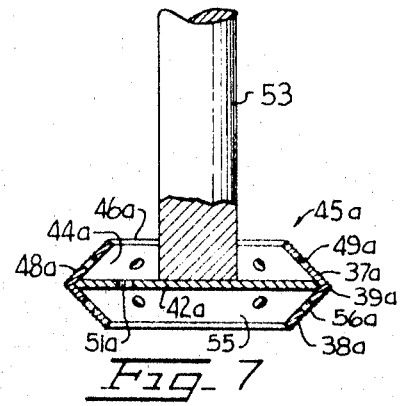
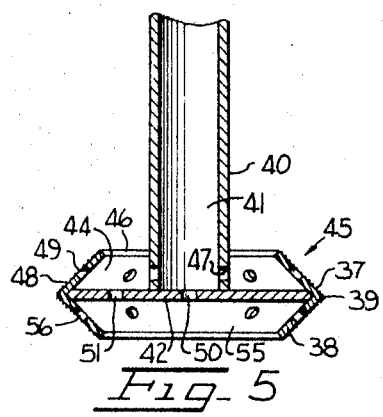
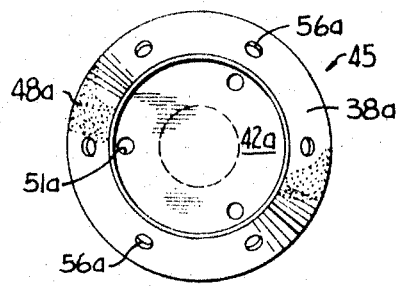
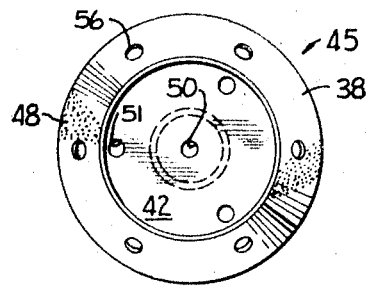
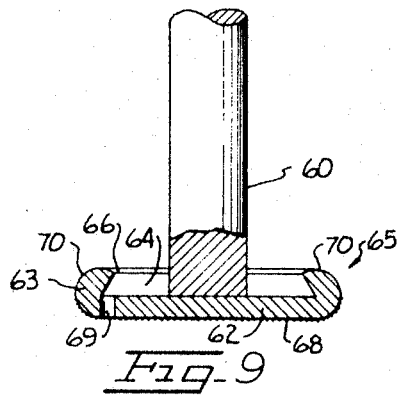
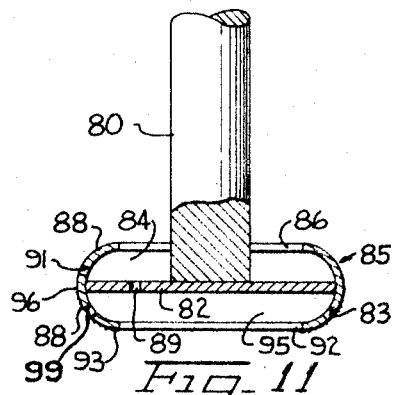
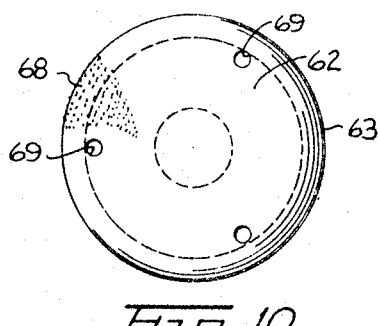
INVENTOR.
MILTON E. NELSON
BY
Warren, Brosler, Cypher & Anglim   ATTORNEYS United States Patent Office 3,461,563
Patented Aug. 19, 1969

3,461,563
ROTARY DENTAL TOOL
Milton E. Nelson, 2631 Danville Highway,
Alamo, Calif. 94507
Filed Oct. 18, 1966, Ser. No. 587,595
Int. Cl. A61c 3/00, 1/00
U.S. Cl. 32—59                               7 Claims

ABSTRACT OF THE DISCLOSURE

Lightweight, dynamically balanced rotary dental tools of varying abrading capacity, designed for high-speed operation and an improved distribution of coolant fluid from within the tool to the tooth surface being worked upon and characterized with a cup-shaped coolant chamber for receiving and centrifugally dispensing coolant to the working surface of the tool.

---

Figure 1:
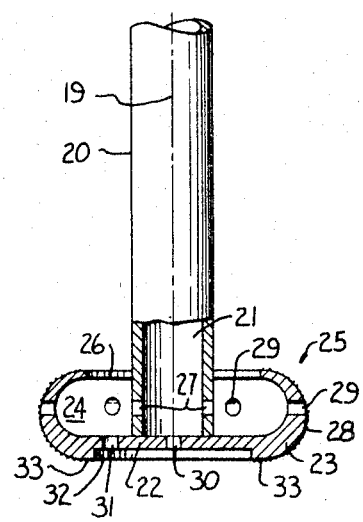

The invention relates to rotary dental tools suitable for high-speed operation, e.g., with high-speed air-turbine drives, which are provided with channels for the flow of a coolant fluid from the tool to the tooth. The tools may have abrasive surfaces and are suitable both for reduction of a tooth and for drilling.

Dental tools designed for use with slow-speed dental handpieces, such as belt-driven chucks, are not suitable for high-speed dentistry, in which rotary speeds of from 100,000 to 400,000 r.p.m. are employed. One problem is the weight factor. The spin rates used in air-turbine dentistry accentuate what was previously tolerable static and dynamic imbalance, and this instability of the tool leads to strong vibrations. Any small imbalance is greatly magnified at high speeds and causes rapid pounding of the tool against the tooth at the point of impact, thereby interfering with accurate control of the tool by the operator. Also, high-speed handpieces frequently employ air cushions, also known as "air bearings," in which even a light degree of inaccuracy in the axis of the stem due to imbalance causes a beeping sound. Still another drawback of massive tools is that they are slow in accelerating and it is desirable that the tools be capable of accelerating so rapidly as to attain peak performance almost instantaneously. Light weight and statically and dynamically balanced tools are, therefore, highly desirable.

Directing coolant fluid on the exterior of the tool working surface has also been found to be unsatisfactory since the coolant usually cannot be directed to contact that area of the tooth surface being abraded. Therefore, emission of coolant from the tool itself is preferable. A further problem encountered is that in lightweight dental tools the discharge of a coolant fluid from the tool onto the tooth surface is much more difficult since extremely fine bores and passages must be employed in lightweight tools, and they cannot be subjected to any substantial pressure. In addition, a maldistribution of the coolant fluid within such passages creates dynamic imbalance.

Also, when a dental tool is formed with more than one active or abrasive surface, it is difficult to distribute the coolant fluid among such surfaces in the case of lightweight tools.

Moreover, there is need for a variety of lightweight dental tools for performing different operations. Among these are tools having abrasive surfaces only at the periphery and inactive end surfaces, suitable for buccal and lingual reduction; and a tool that is abrasive at the end face and, if desired, also at the peripheral surface. Each of such embodiments present related by specifically different problems in the discharge of coolant fluid.

Accordingly, it is an object of the present invention to provide a rotary dental tool constructed for an improved distribution of coolant fluid to the tooth surface being worked upon.

Another object of the present invention is to provide a rotary dental tool constructed for emission of coolant therefrom and having improved static and dynamic balance for use in high-speed air-turbine dental handpieces.

Another object of the present invention is to provide a high-speed dental tool having an improved abrading capacity.

Another object of the present invention is to provide a high-speed rotary dental tool which is suitable for use with conventional or air-turbine handpieces and a variety of coolant fluid ducting constructions.

A further object of the present invention is to provide a method for cooling a rotary dental tool and tooth surface which affords a more effective heat transfer and removal of abraded matter.

Still another object of the preesnt invention is to provide a high-speed, fluid cooled, rotary dental tool which is easy and relatively inexpensive to manufacture, lightweight, and convenient to use.

The invention possesses other objects and features of advantage, some of which of the foregoing will be set forth in the following description of the preferred form of the invention which is illustrated in the drawings accompanying and forming part of this specification.

Figure 3:
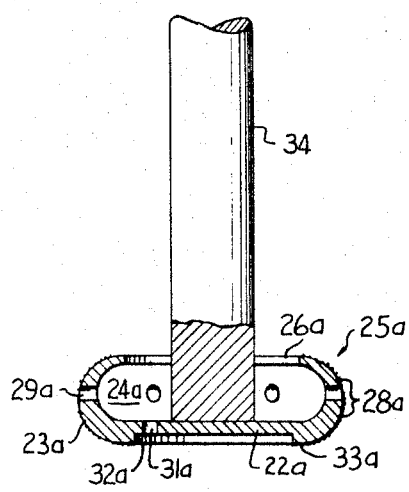
Figure 2:
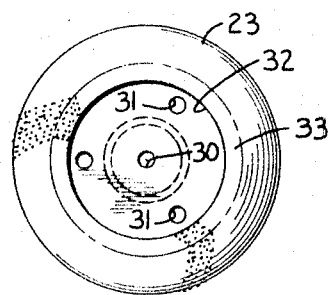
Figure 4:
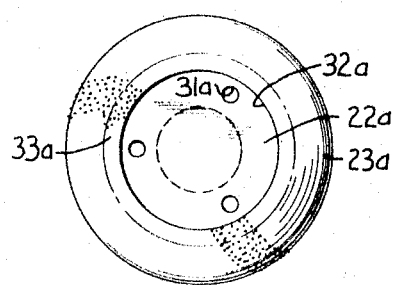

Referring to said drawing (two sheets):
FIGURES 1 and 2 are a longitudinal section and a bottom plan, respectively, of a rotary dental tool construed in accordance with the present invention with part of the shank appearing in elevation in the former view;
FIGURES 3 and 4 are similar views of a second embodiment;
FIGURES 5 and 6 are similar views of a third embodiment;
FIGURES 7 and 8 are similar views of a fourth embodiment;
FIGURES 9 and 10 are similar views of a fifth embodiment; and
FIGURE 11 is a longitudinal section of a sixth embodiment, part of the shank appearing in elevation.

Now according to this invention, there is provided a lightweight dental tool which is suitable for high-speed operations that can be constructed according to any of a variety of forms for performing different specific tasks, all of which forms being provided with means for collecting and discharging coolant fluid from within the tool.

The rotary dental tools of the present invention are suitable for use with conventional or air-turbine handpieces. Air-turbine handpieces utilize compressed air which imparts rotary motion to a tubular drive shaft through turbine blades or vanes. The tubular shaft carries a chuck means, such as a frictional plastic chuck, for releasably securing the shank of the dental tool to the drive shaft.

Two techniques are usually employed to supply coolant fluid to the working surface of the tool. One is shown in my U.S. Patent No. 3,136,059 which comprises supplying the coolant axially down the tubular drive shaft and a bore in the drill shank. A second handpiece construction in wide spread use directs coolant toward the exterior surface of the drill by nozzles, usually, carried by the handpiece near the chuck. These nozzles direct coolant convergingly toward the shank of the drill so as to flow immediately along the bottom of the shank and over the drill head. Handpieces of the latter type are manufactured by the following companies, among others: Midwest Dental Manufacturing Company, Melrose Park, Ill.; Densco, Inc., Denver, Colo.; Encore Company, Portland, Oreg.; Starlight Dental Company, Philadelphia, Pa. Such handpiece constructions, not being part of this invention, are not shown.

In summary, the rotary dental tool of the present invention comprises, briefly, a shank 20 and head 25 thereon having an external working surface, the head being formed with an upstanding wall 23 in radially spaced relation to the axis 19 of the shank to define an open topped cup-shaped coolant chamber 24 for confining coolant therein under centrifugal forces generated upon rotation of the tool, the open top 26 of the chamber being formed for receipt of coolant directed from the exterior of the head into the chamber while the tool is being rotated, and head 25 being formed with a passage extending between chamber 24 and the working surface for conducting coolant to the surface. The coolant passage may be formed for centrifugal discharge of coolant from chamber 24 such as by forming in wall 23 a plurality of radially extending ports 29 spaced symmetrically about the periphery of the tool. Alternatively, the coolant passage can be formed as a plurality of axially extending ports 31 as will be more fully set forth below.

Referring to FIGURES 1 and 2, the tool according to one embodiment comprises a tubular shank 20 having a bore 21 for the flow of coolant fluid. Fixed to the bottom of the shank is a transverse wall 22 having an integral peripheral wall 23 which encloses a space or chamber 24 for coolant fluid above the wall 22. The walls 22 and 23 together form a wheel 25 and these parts may be formed integrally with the shank. The top of the wheel has an annular inlet opening 26 through which the shank extends and the lower part of the shank has radial ports 27 for the admission of coolant fluid. The outside of the peripheral wall 23 is shaped as a continuously outwardly convex surface of revolution about the shank axis, preferably merging with the bottom face of the wheel. The working surface or outside of the wall 23 is abrasive, e.g., it is coated with small particles 28 of diamond or the like formed or embedded in the wall. The inner surface of the wall 23 is preferably also a surface of revolution about the stem axis so as to attain weight balance, and is concave in cross section to collect coolant fluid. Wall 23 is preferably formed with a plurality of radial passages 29 symmetrically distributed about the tool periphery and situated radially outward from the inlet opening 26 (as limited by the hollow shank 20).

In operation, with the tool secured within the drive shaft of the handpiece, the tool is rotated at high speed while coolant fluid is supplied either as a liquid or as a mist through the bore 21. This fluid flows radially out through the ports 27 and is flung out against the inner face of the wall 23, the liquid droplets being coalesced when a mist is supplied. When the abrasive outer surface 28 of the peripheral wall is applied to a tooth, the liquid coolant flows through the coolant passages 29 to the work surface.

Alternatively, and in order to provide a tool which is easier to construct and one which is particularly well suited for the use of the annular end surface 33 of the tool for reduction of the tooth surface, transverse wall 22 may have a central port 30 in direct communication with bore 21 and/or ports 31 formed therein and communicating with space 24. As so constructed, coolant fluid will flow from tubular shank 21 out through port 30 to a recess 32 defining the inner edge of annular end surface 33. Coolant fluid in recess 32 will be urged centrifugally and hydrostatically to the edge and then discharge over annular surface 33 to cool the tooth surface being worked upon. The same result can be achieved by forming the tool with radial ports 27, axial ports 31 and eliminating port 30. When this construction is employed, peripheral wall 23 is preferably not formed with ports 29 in order to increase axial flow of the coolant material to recess 32 and subsequent radial discharge over the abrasive annular surface 33. This latter construction is required when a solid shank 34 is used, as may be seen in FIGURE 3. Ports 30 and 31 in addition serve to permit moisture to leave the tool when out of service.

The tool being light in weight, accelerates rapidly and is less subject to vibration than heavier tools. Also, the coolant fluid can be supplied in the form of a mist and is forced out through the symmetrically arranged passages 29 by centrifugal force in a manner which does not significantly unbalance the tool.

The tool shown in FIGURES 3 and 4 is similar to that just described and like parts bear like reference characters followed by the letter a. This embodiment differs in that the shank 34 is solid, and coolant fluid is admitted to the space 24a through the annular part of the inlet opening 26a which surrounds the shank. In this case the coolant fluid is supplied from a jet nozzle, as was described above, preferably in the form of a mist emitted from the dental handpiece. The tool of FIGURES 3 and 4 will be less expensive to construct than the tool of FIGURES 1 and 2 and will be particularly well suited for use with older conventional handpieces which are not ducted or otherwise formed to allow axial flow of coolant down a tubular tool shank. Even when low-speed handpieces are employed, the advantages of centrifugal discharge of coolant onto the surface being worked upon from within the tool itself will be substantial.

Referring to FIGURES 5 and 6, there is shown a dental tool having the peripheral wall formed of upper and lower frusto-conical sections 37 and 38 which are joined at a sharp edge 39 which appears as an angle of approximately 90° in cross section. This angle is, however, subject to considerable variation. The tool includes, further, a tubular shank 40 having a bore 41 and fixed at its bottom to a transverse wall 42 which is situated at the mid-height of the wheel 45, i.e., at the level of the edge 39. The upper peripheral wall section 37 encloses a space 44 above the transverse wall 42 for the collection of coolant fluid which is admitted from the bore 41 through radial ports 47 in the shank, and the top of this wall 37 provides an inlet opening 46 through which the shank extends. The lower wall section 38 encloses an auxiliary space 55 below wall 42 for the collection of cooling fluid which enters through ports 50 and 51 formed in wall 42 in alignment with the bore 41. The bottom of the wheel is fully open at the lower-most level of the peripheral wall section 38. The upper and lower peripheral wall sections 37 and 38 have coolant passages 49 and 56, respectively, through which coolant flows outwardly by centrifugal force as described for the first two embodiments. The wall sections 37 and 38 are abrasive, e.g., they have diamond chips 48 embedded therein.

Coolant flowing downwards through the ports 50 and 51 is flung radially outwards by centrifugal force upon rotation of the tool and collects on the inner face of the wall section 38 and along transverse wall 42. The coolant thus collected will flow axially through port 51 to auxiliary space 55 for centrifugal emission from ports 56.

In the embodiment of FIGURES 7 and 8, the construction differs from that just described only in that the stem 53 is solid and coolant is supplied through the annular part of the inlet opening 46a as described for the second embodiment. Other corresponding parts bear reference numbers like those of FIGURES 5 and 6 but with the suffix a.

The frusto-conical peripheral wall of the tool in FIGURES 5 through 8 is particularly well suited for doing crown work. Again, the tool of FIGURES 7 and 8 is easier to construct and less expensive than the tool of FIGURES 5 and 6 and, therefore, more appropriately employed when older dental handpieces are used which cannot utilize the advantages of a hollow shank.

FIGURES 9 and 10 show a fifth embodiment in which the wheel has an abrasive lower face. The tool includes a solid shank 60 fixed to a transverse wall 62 having a peripheral wall 63 formed integrally therewith. The peripheral wall encloses a space 64 above the wall 62 for coolant fluid, which is supplied as described for the second embodiment through the annular part of an inlet opening 66 at the top of the wheel 65. It will be noted that the inner surface of the enclosing wall 63 converges radially inwards toward the top to permit coolant fluid to be collected against the enclosing wall. The outer surface of this wall may be shaped as was described for the first embodiment. A plurality of coolant passages 69 are formed in the wall 62 at the radially outer extremity of the space 64 for the downward flow of coolant fluid under the hydrostatic head created by centrifugal action. The lower face of the wall 62 and the outside of the wall 63 are abrasive, e.g., by having embedded therein diamond chips 68.

It is evident that in this embodiment the coolant fluid is discharged from the space 64 through the passages 69 against the working surface. The tool of FIGURES 9 and 10 could alternatively be formed with a tubular shank and ports as set forth in the description of the tools of FIGURES 1 and 2 and FIGURES 5 and 6.

The tool of FIGURES 9 and 10 is particularly well suited for reducing the buccal and lingual surfaces of a tooth for capping. For such use, it is preferable that diamond chips 68 do not cover the surface 70 above the thickness of wall 62 so that surface 70 will not injure the gums when reducing the surface of the tooth immediately adjacent the gum.

Referring to FIGURE 11, the sixth embodiment combines the features of the second and fourth embodiments, in providing a peripheral wall 83 that is rounded and a transverse wall 82 that is situated at the mid-height of the wheel 85. The solid shank 80 is fixed to the wall 82, although it will be understood that a tubular shank can be employed, and coolant fluid is admitted through the annular top inlet opening 86 to the space 84 above the transverse wall 82. An auxiliary space 95 to which coolant fluid is supplied through axial ports 89 (these being symmetrically positioned as is shown for the ports 51a of FIGURES 7 and 8) is enclosed by the lower section of the wall 83. Coolant is discharged from the space 95 out the open end 92 when the annular surface 93 (corresponding to surfaces 33 and 33a) is used as the working surface of the tool.

Coolant passages 99 formed in the lower section of wall 83 can alternatively be provided if the peripheral convex surface 88 of wall 83 is used as the working surface. In the latter instance, the wall 83 may also be formed with openings 91 to allow communication of coolant from space 84 to the tooth surface. The external surface of wall 83 including surfaces 88 and 93 is abrasive, e.g., has embedded diamond chips therein as shown at 96.

I claim:

1. A rotary dental tool comprising, a shank and a head thereon having an external working surface, said head being formed with an upstanding wall in radially spaced relation to the axis of said shank to define an open topped cup-shaped coolant chamber for confining coolant therein under centrifugal forces generated upon rotation of said tool and a transverse wall extending across the lower end of said shank, said shank being formed with an axial bore therein having an opening for the introduction of coolant fluid into said bore and a plurality of radial ports extending between said bore and said chamber for the flow of coolant fluid from said bore into said chamber, and said head being formed with a passage extending between said chamber and working surface for conducting coolant fluid to said surface.

2. A rotary dental tool comprising, a shank and a head thereon having an external working surface, said head being formed with an upstanding wall in radially spaced relation to the axis of said shank to define an open topped cup-shaped coolant chamber for confining coolant therein under centrifugal forces generated upon rotation of said tool, and a transverse wall extending across the lower end of said shank, said shank being formed with an axial bore therein having an opening for the introduction of coolant fluid into said bore, said bore terminating in a port in alignment therewith and extending through said transverse wall for the downward flow of coolant therethrough for discharge onto said working surface.

3. A tool as defined in claim 2 wherein said shank is formed with a plurality of radial ports extending between said bore and said chamber for the flow of coolant fluid from said bore into said chamber and said head being formed with a passage extending between said chamber and working surface for conducting coolant fluid to said surface.

4. A rotary dental tool comprising a shank and a wheel fixed to the lower end of the shank, said wheel including a wall extending transversely to the axis of the shank and a peripheral wall enclosing above said transverse wall a space for a coolant fluid, the exterior working surface of said peripheral wall being abrasive and formed as a surface of revolution about the axis of said shank which is continuously outward convex, said wheel being formed at a radially outer part thereof with a coolant passage extending through said peripheral wall for the discharge of coolant fluid from said space by centrifugal force, said peripheral wall being further formed above said passage with an interior surface which extends radially inwardly from said passage toward said shank, and said wheel being formed at its top with an opening situated radially inwardly from the parts thereof which contain said coolant passage for admitting coolant fluid into said space.

5. A tool as defined in claim 4 wherein said peripheral wall includes upper and lower frusto-conical sections situated respectively above and below said transverse wall, said sections being joined along a peripheral edge.

6. A rotary dental tool comprising a shank and a head fixed to the lower end of the shank, said head including a wall extending transversely to the axis of the shank and a peripheral wall extending a substantially equal distance above and below said transverse wall, said peripheral wall being further formed above said transverse wall with an interior surface which extends radially inwardly toward said shank adjacent said transverse wall to enclose above said transverse wall a space for the collection of coolant fluid, said peripheral wall below said transverse wall enclosing an auxiliary space for coolant, said head being formed with an opening for receipt of coolant directed from the exterior of said head into said space above said transverse wall, said transverse wall being formed with a passage for the downward flow of coolant from said space above said transverse wall into said auxiliary space, said interior surface retaining said coolant fluid in communication with said passage in said transverse wall during rotation of said tool and said head being formed with a coolant passage communicating with said auxiliary space for discharge of coolant fluid therefrom under centrifugal force.

7. A tool as defined in claim 6 wherein said auxiliary space is open to the bottom of said head for discharge of coolant therefrom.

References Cited

UNITED STATES PATENTS

| 2,697,878 | 12/1954 | Oberley | 32—59 |
| 3,259,959 | 7/1966 | Tobey | 51—209 |

FOREIGN PATENTS

| 178,419 | 5/1954 | Germany. |

ROBERT PESHOCK, Primary Examiner

U.S. Cl. X.R.

51—209